US010053355B2

(12) United States Patent
Garcia et al.

(10) Patent No.: US 10,053,355 B2
(45) Date of Patent: Aug. 21, 2018

(54) ADAPTABLE INSULATED GALLEY CART CARBONATED BEVERAGE DELIVERY SYSTEM

(71) Applicant: The Boeing Company, Chicago, IL (US)

(72) Inventors: Emmanuel A. Garcia, Mukilteo, WA (US); Joshua Y. Lee, Seattle, WA (US); Christopher Rinauto, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/186,871

(22) Filed: Jun. 20, 2016

(65) Prior Publication Data

US 2017/0362072 A1    Dec. 21, 2017

(51) Int. Cl.
| | | |
|---|---|---|
| *B67D 1/00* | (2006.01) | |
| *B67D 1/08* | (2006.01) | |
| *B67D 1/04* | (2006.01) | |
| *B67D 1/06* | (2006.01) | |

(52) U.S. Cl.
CPC ......... *B67D 1/0891* (2013.01); *B67D 1/0406* (2013.01); *B67D 1/06* (2013.01); *B67D 1/0801* (2013.01); *B67D 2001/0822* (2013.01); *B67D 2210/00139* (2013.01)

(58) Field of Classification Search
CPC .............. B67D 2220/0013; B67D 1/06; B67D 1/0857; B67D 1/0891; B67D 1/0406; B67D 1/0801; B67D 2210/00031; B67D 2210/00133

USPC ................... 222/129.1, 146.6, 399, 398, 131
See application file for complete search history.

(56) References Cited

U.S. PATENT DOCUMENTS

| | | | | |
|---|---|---|---|---|
| 1,676,108 | A * | 7/1928 | Novak | A47B 11/00 108/106 |
| 2,083,776 | A | 6/1937 | Graham | |
| 2,861,857 | A * | 11/1958 | Lee | A47B 83/045 312/312 |
| 3,065,037 | A * | 11/1962 | Chapman | A47B 9/00 312/25 |
| 3,180,529 | A | 4/1965 | Buffington | |
| 3,232,489 | A | 2/1966 | Buffington | |
| 3,232,491 | A * | 2/1966 | Hunt | B65D 81/3827 217/52 |
| 3,932,009 | A * | 1/1976 | Zollinger | A47B 9/04 108/147 |
| 4,161,234 | A * | 7/1979 | Munn | A47B 31/00 186/52 |
| 4,350,267 | A | 9/1982 | Nelson et al. | |
| 6,648,187 | B1 | 11/2003 | Shypkowski | |
| 7,246,727 | B2 * | 7/2007 | Magermans | B67D 1/0412 222/529 |
| 7,861,892 | B1 * | 1/2011 | White | B67D 1/06 222/108 |

(Continued)

*Primary Examiner* — Charles P Cheyney
(74) *Attorney, Agent, or Firm* — Felix L. Fischer (57) ABSTRACT

A galley cart carbonated beer dispensing system employs a housing defining a cavity. A door is coupled to the housing and configured to be moved between a closed position and an open position. A keg is received in the cavity and a carbonation cylinder is received in the cavity and connected to the keg. A spigot is supported on a dispensing tower extending from a top of the housing and connected to the keg. The dispensing tower is retractable into the cavity.

14 Claims, 9 Drawing Sheets

(56) References Cited

U.S. PATENT DOCUMENTS

| | | | | |
|---|---|---|---|---|
| 8,672,200 B2* | 3/2014 | O'Hare | ................... | B60R 9/06 |
| | | | | 224/519 |
| 9,193,461 B2 | 11/2015 | Schalla | | |
| 9,809,238 B2* | 11/2017 | Kincaid | ................. | B62B 1/264 |
| 2012/0318822 A1* | 12/2012 | Strauss | ................. | A47B 31/02 |
| | | | | 222/129.1 |
| 2013/0193673 A1* | 8/2013 | Vanderberg | .............. | B62B 3/16 |
| | | | | 280/655 |

* cited by examiner

ADAPTABLE INSULATED GALLEY CART CARBONATED BEVERAGE DELIVERY SYSTEM

BACKGROUND INFORMATION

Field

Embodiments of the disclosure relate generally to the galley cart systems for transportation vehicles and more particularly to a galley cart holding a beverage keg and carbonation cylinder and having a retractable dispensing tower.

Background

Galley carts employed for food service in transportation vehicles such as aircraft and trains. The galley carts may be insulated to maintain contents at a desired cooler temperature. Beer is typically served from galley carts in aircraft and trains in bottled or canned form. Patrons often prefer draft beer.

SUMMARY

Exemplary embodiments provide a galley cart carbonated beer dispensing system having a housing defining a cavity. A door is coupled to the housing and configured to be moved between a closed position and an open position. A keg is received in the cavity and a carbonation cylinder is received in the cavity and connected to the keg. A spigot is supported on a dispensing tower extending from a top of the housing and connected to the keg. The dispensing tower is retractable into the cavity.

The embodiments provide a method for dispensing beer by mounting a beer keg a CO2 cylinder in the galley cart. The CO2 cylinder is connected to a tap on the keg and a supply tube connection is connected from the to a dispensing connection on a spigot. A dispensing tower carrying the spigot is extended from a top of the galley cart and secured with a position engagement system in the extended position. Beer is then dispensed from the spigot.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein provide a storage and dispensing system for a carbonated beverage, such as draft beer, that may be used in conjunction with standard galley carts. More specifically, the embodiments described herein provide a galley cart for use in a transportation vehicle that includes capability for dispensing draft beer while retaining a desired form factor for storage and operation in aircraft or other transportation vehicle galleys. An insulated half-size galley cart houses up to a sixth barrel beer keg (a.k.a., a 5.16 gallon (20 liter) beer keg) and $CO_2$ cylinder for carbonation and employs a dispensing tower with a beer spigot connected to a keg tap, with the dispensing tower retractable into an interior cavity of the galley cart.

Figure 1:
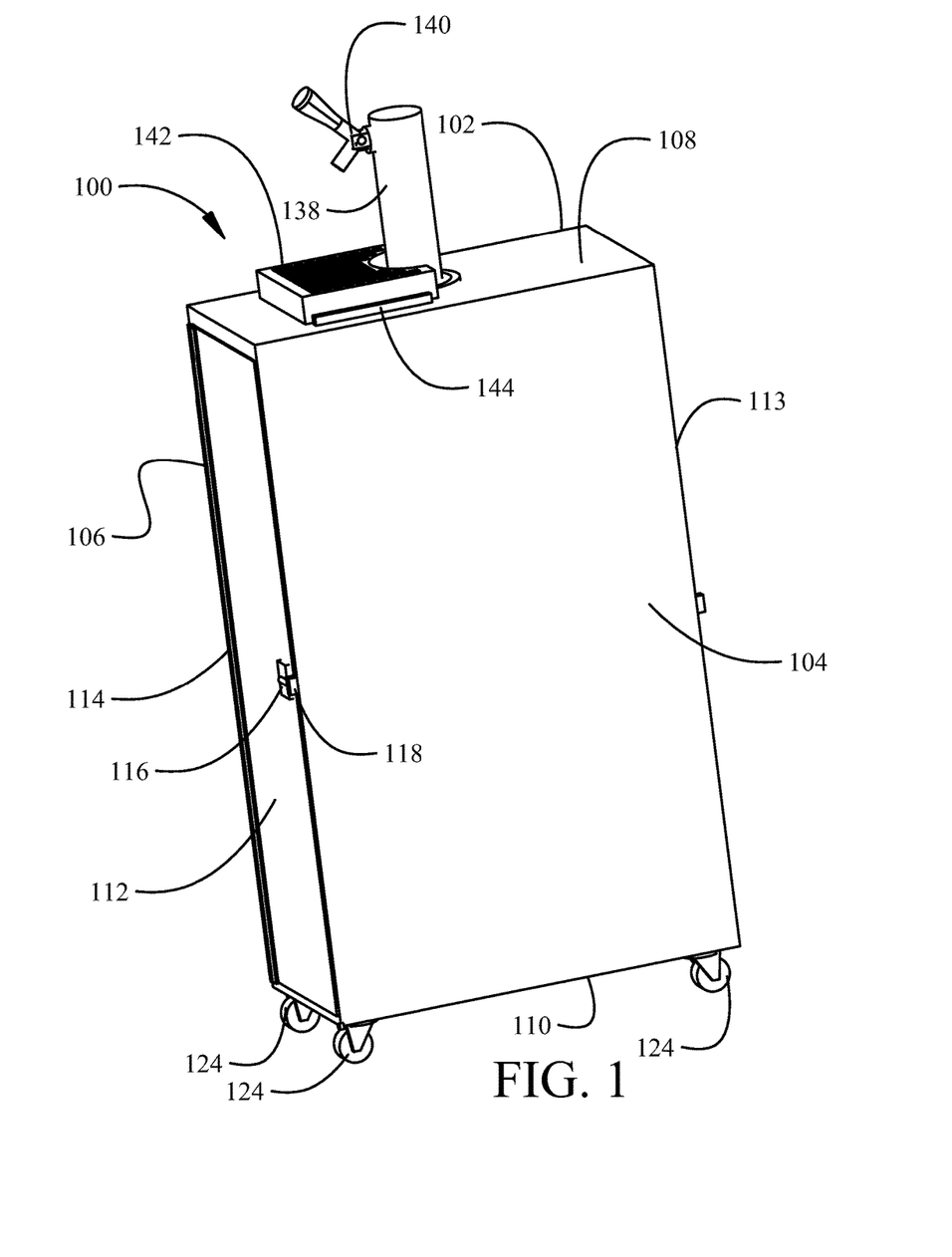
FIG. 1 is a perspective view of an example a galley cart in which the described embodiments may be employed.

Referring to the drawings, FIG. 1 is a perspective view of a galley cart 100 which may be employed in the embodiments disclosed herein. In one aspect of this embodiment, the galley cart 100 includes a housing 102. In the illustrated embodiment, the housing 102 has a first side 104, a second side 106, a top 108, and a bottom 110. The galley cart 100 further includes a first door 112 positioned on one end of the housing 102, and, for certain embodiments, a second door (seen in subsequent figures) is positioned on an opposite end of the case 102. Each of the doors 112 can further include one or more hinges 114 and a latch 116. The hinges 114 pivotally attach the doors 112 to the housing 102. The latch 116 can be configured to releasably engage corresponding receivers 118 attached to the housing 102 when the doors 112 are in closed positions as illustrated in FIG. 1. The galley cart 100 may employ insulation in the housing 102 to maintain a desired temperature for internal components in the cart. Dry ice or other preconditioned cooling blocks may be employed for cooling.

Figure 2:
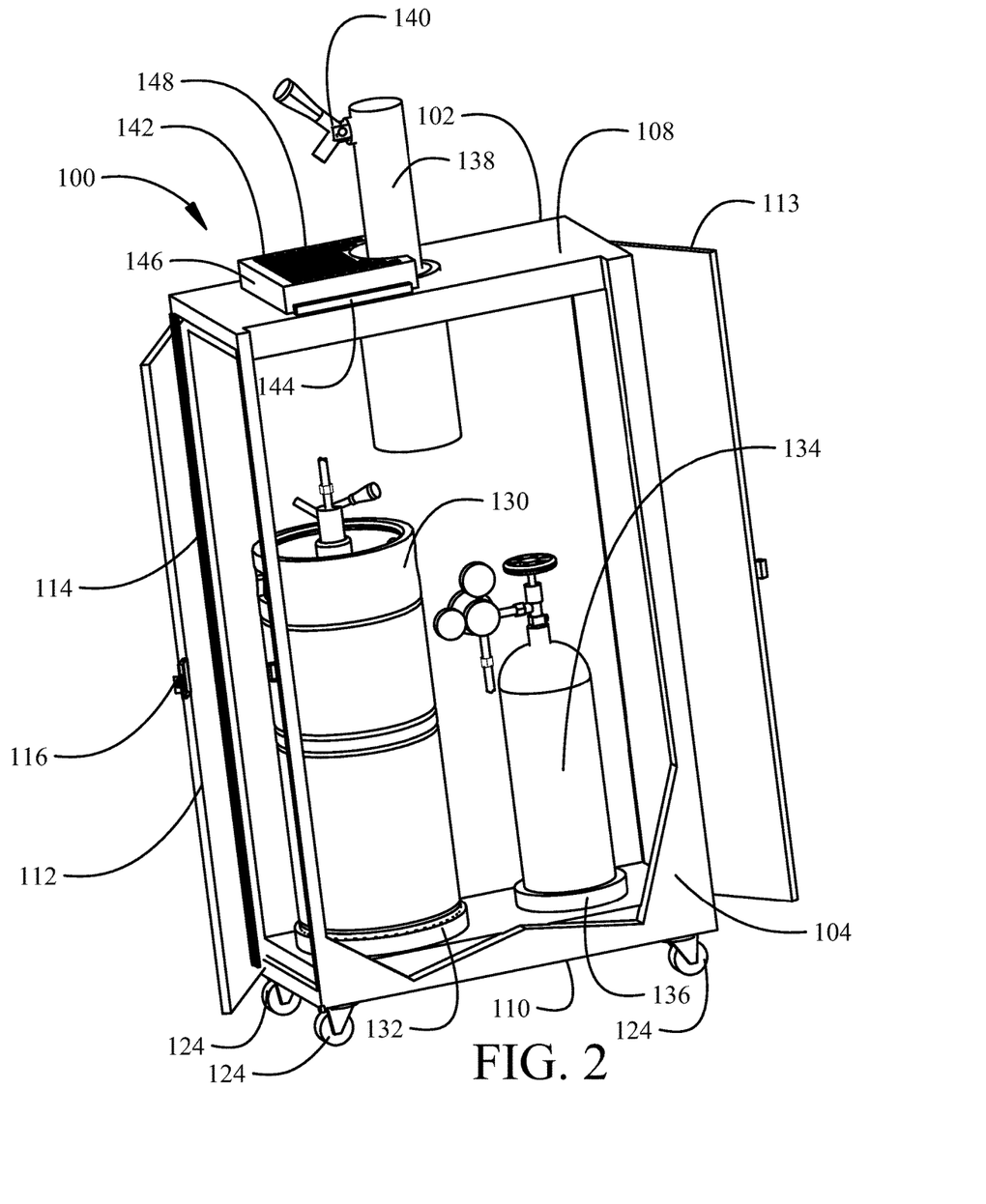
FIG. 2 is a cutaway perspective view of the galley cart of FIG. 1 with a portion of one side removed to show placement of internal components with the dispensing tower in the extended position.

By disengaging the latch 116 from the corresponding receiver 118, the doors 112 can be opened outwardly providing access to an interior cavity 120 of the housing 102 as shown in FIG. 2. Positioning the doors 112 at respective ends of the housing 102 allows flight attendants or service personnel to conveniently access components within the housing 102 from either end of the galley cart 100. In other embodiments, the second door can be omitted if desired. Wheels or casters 124 allow the galley cart to be easily maneuvered within the service areas and aisles of the aircraft.

As seen in FIG. 2, an industry standard sixth barrel beer keg 130 (beer industry standard 5.16 gallon keg) is restrained in a mounting ring 132 mounted on the bottom 110 of the cart housing 102. A carbonation cylinder such as pressurized gaseous $CO_2$ cylinder 134, a standard 20 cubic foot (566.3 liter) high pressure cylinder in an exemplary embodiment, is restrained in a second mounting ring 136. Straps or clamps may be employed alternatively or in addition to the mounting rings to restrain the keg and cylinder within the housing. The sizing of the sixth barrel keg 130 and $CO_2$ cylinder 134 allow accommodation of those elements in an insulated half-size galley cart 100 having exterior dimensions of 12 inches (")×40"×16" (30.5 centimeters (cm)×101.6 cm×40.5 cm).

A dispensing tower 138 having a spigot 140 extends upward from the top 108 of the housing 102 and a glass support and overflow sump 142 is received in supports 144 on the top 108 adjacent the tower 138 to support a glass for filing from the spigot 140 and to catch any overflow from the glass during filing. For the embodiment shown, the glass support and overflow sump 142 is a self-contained tray 146 and a mesh or screen top 148 which may be easily removed and inverted to drain any accumulated overflow. In alternative embodiments a drain from the sump to a larger container in the cart or overboard for connection to a supplement drain (or both) may be employed.

Figure 3:
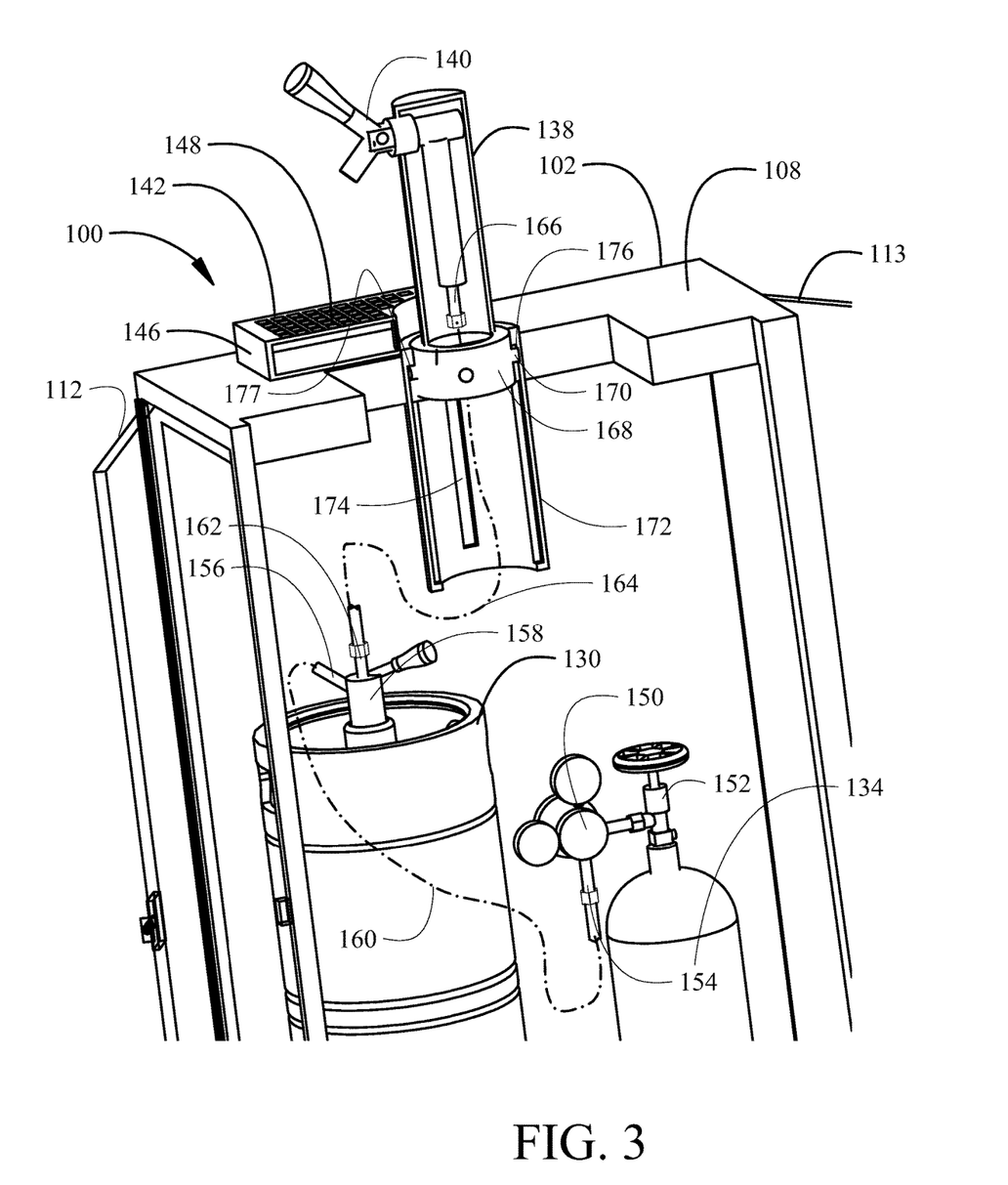
FIG. 3 is a detailed perspective view of the dispensing tower retraction and engagement system with the dispensing tower sectioned to reveal connection details.

FIG. 3 shows the internal connections between the keg 130, CO2 cylinder 134 and spigot 140. A regulator and pressure gage assembly 150 is attached to a supply valve 152 on the CO2 cylinder 134. An outlet tube connection 154 on the regulator and pressure gage assembly 150 provides CO2 to an inlet tube connection 156 on a keg tap 158 through line 160 to pressurize the keg 130. A supply tube connection 162 on the keg tap 158 provides beer through line 164 to a dispensing tube connection 166 attached to the spigot 140. Lines 160 and 164 are truncated at the fittings and shown by centerline only for clarity of the remaining components.

Figure 4:
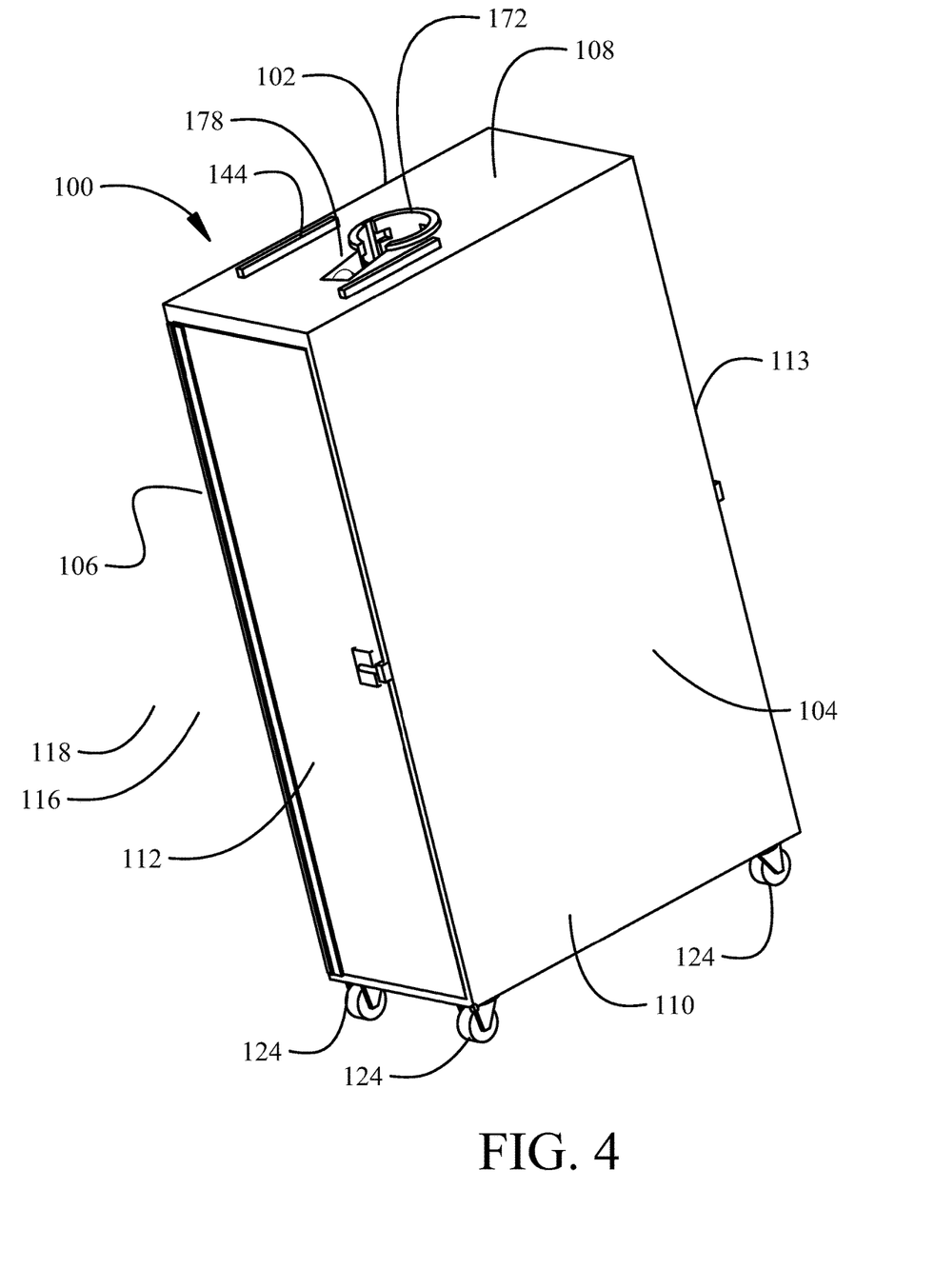
FIG. 4 is a perspective view of the dispensing tower in the retracted position and the glass support and overflow sump in the stored position.
Figure 5:
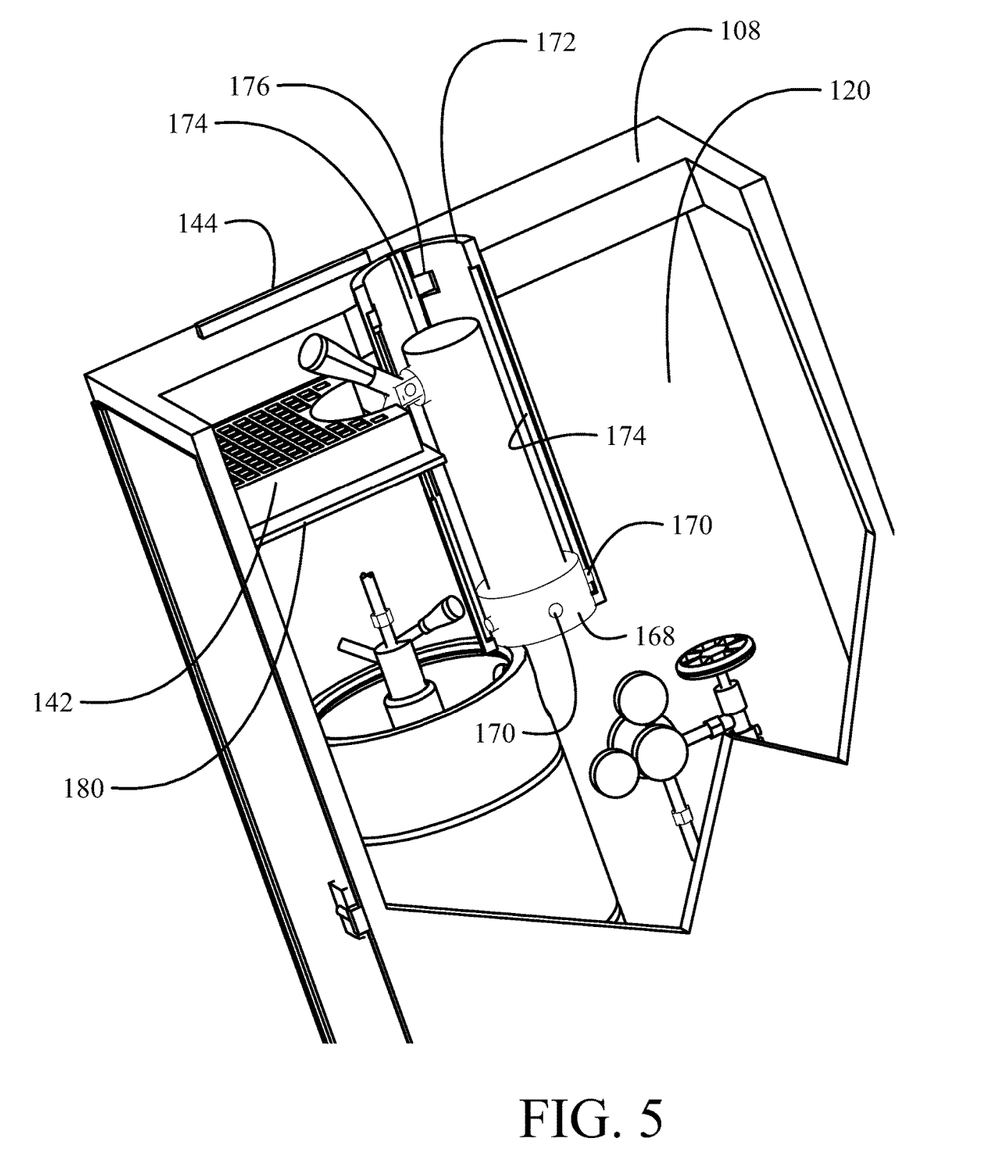
FIG. 5 is a detailed cutaway perspective view of the dispensing tower retraction and engagement system in the retracted position.

The dispensing tower 138 is retractable into the cart housing 102. The dispensing tower 138 extends from a support element 168 which is telescopically engaged in a cylindrical receiver 172. A position engagement system employs radial engagement stubs 170 extending from the support element 168 received in vertical slots 174 in the cylindrical receiver 172 for vertical translation and connecting horizontal detents 176 substantially at a top 177 of the vertical slots allowing rotation of the support element 168 to engage the detents to fix the dispensing tower in an extended position seen in FIGS. 1, 2 and 3. Opposite rotation of the support element 168 from the detents 176 to align the engagement stubs 170 with the vertical slots 174 allows retraction of the dispensing tower into the cart housing 102 as seen in FIGS. 4 and 5. A slot 178 extending from receiver 172 in the top 108 of the housing 102 receives the spigot 140 to allow complete retraction for the embodiment shown.

Figure 6:
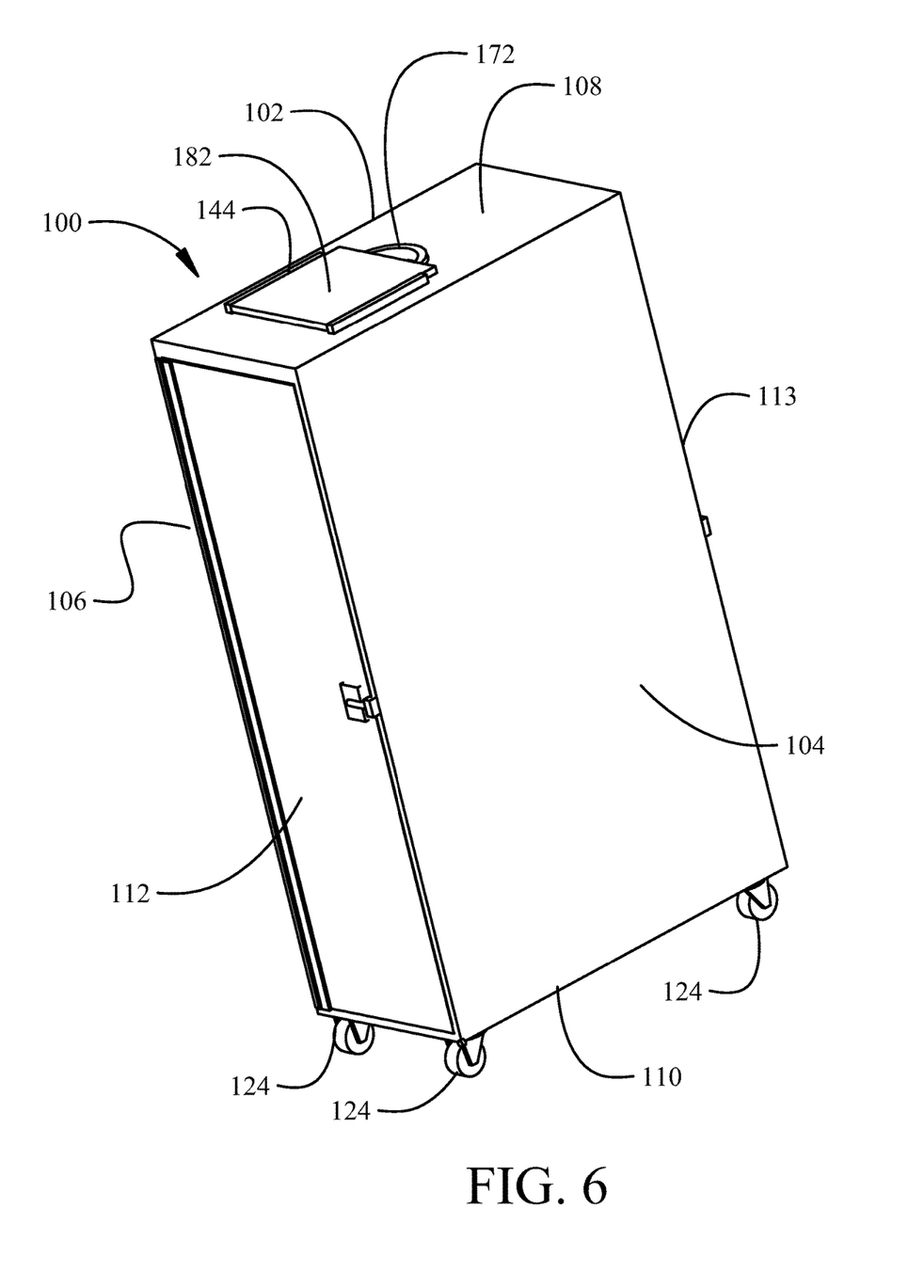
FIG. 6 is a perspective view of the dispensing tower in the retracted position and the cover plate installed.

The dispensing tower 138 is rigidly attached to the support element 168 for the embodiment shown and rotates with the support element 168. In alternative embodiments, the support element 168 and dispensing tower 138 may be engaged in a slip fit arrangement to allow separate rotation of the support element 168 for engagement and disengagement from the detents 176. The glass support and overflow sump 142 when engaged on the top 108 of the housing 102 covers the slot 178. The glass support and overflow sump 142 is removable from the top 108 and may be stored on a shelf or lateral supports 180 in the interior cavity 120 of the housing 102 as seen in FIG. 5 and a cover plate 182 installed over the slot 178 as seen in FIG. 6 to reduce overall height of the cart 100 for stowing. While shown as extending above the top 108, the supports 144 may be recessed in the top with a relieved cavity to receive or partially receive the glass support and overflow sump 142 and cover plate in alternative embodiments (as seen in FIG. 7).

Figure 7A:
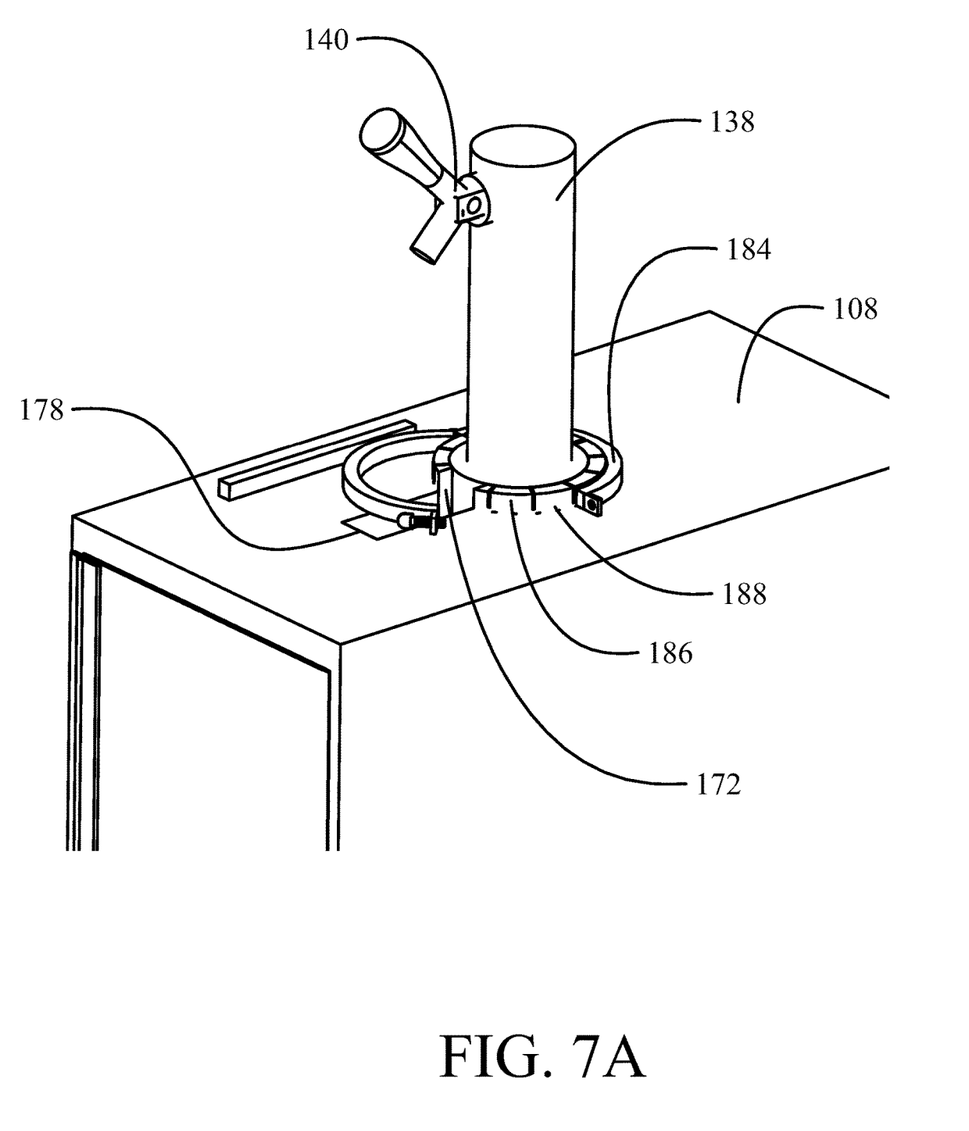
FIG. 7A is a detailed perspective view of an alternative embodiment of the dispensing tower.
Figure 7B:
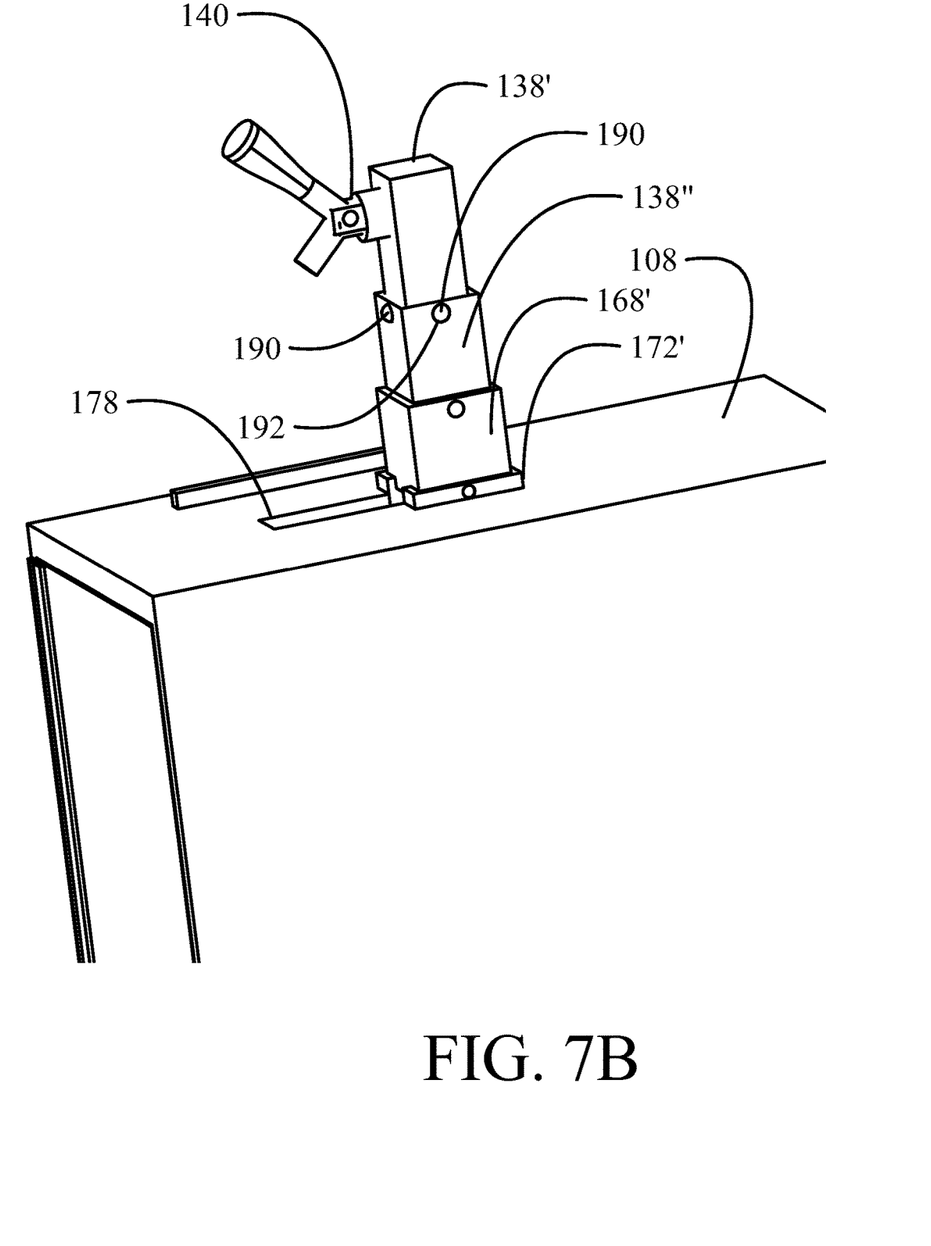
FIG. 7B is a detailed perspective view of a second alternative embodiment of the dispensing tower; and, FIG. 8 is a flow chart of a beer dispensing method enabled by the disclosed embodiments.

As seen in FIG. 7A, a split clamp 184 may be employed as a first alternative position engagement system to engage the support element 168 of the dispensing tower 138 by compressing slotted segments 186 in a collar 188 of the cylindrical receiver 172. In other alternative embodiments, the position engagement system may employ removable pins or depressible buttons in the dispensing tower 138 to engage mating features in the collar 188 of the cylindrical receiver 172. While disclosed in the first embodiment as cylindrical in shape the dispensing tower and support 168' and receiver 172' may be rectangular, as seen in FIG. 7B (dispensing tower 138') or of other geometric form. Additionally while shown as a single segment, the dispensing tower 138' may employ multiple telescoping segments 138", also seen in FIG. 7B, with depressible buttons 190 received in detent holes 192.

Figure 8:
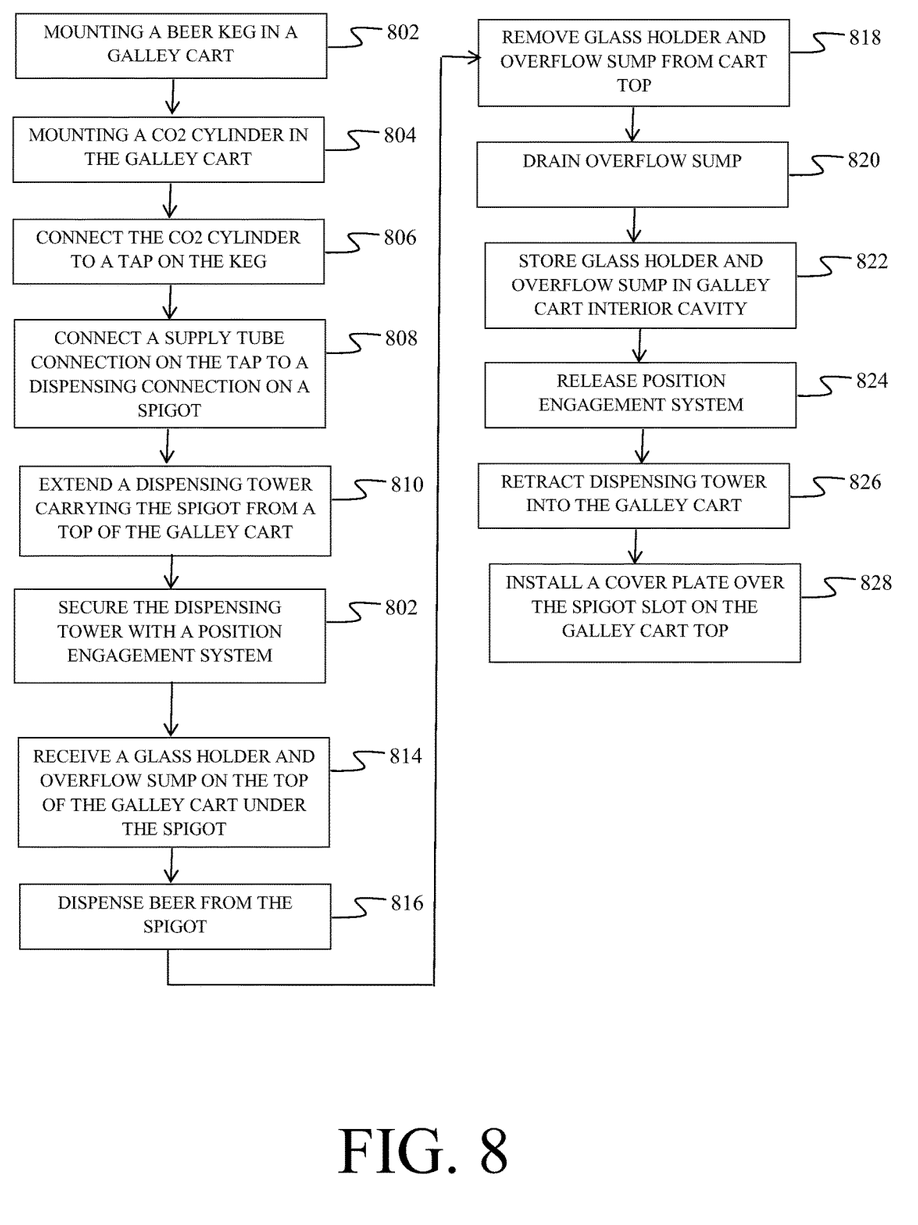

As shown in FIG. 8, the embodiments herein provide a method for portable beer dispensing by mounting a beer keg 130 in a galley cart 100, step 802, and mounting a CO2 cylinder 134 in the galley cart 100, step 804. The CO2 cylinder 134 is connected to a tap 158 on the keg 130 with a regulator and pressure gage assembly 150, step 806. A supply tube connection 162 from the tap 158 is connected to a dispensing tube connection 162 on a spigot 140, step 808. A dispensing tower 138 having the spigot 140 is extended from a top 108 of the galley cart 100, step 810, and a position engagement system secures the dispensing tower 138 in the extended position, step 812. A glass holder and overflow sump 142 is received on the top 108 of the galley cart 100 under the spigot 140, step 814. Beer is then dispensed, step 816. Upon completion of desired dispensing of beer, the glass holder and overflow sump 142 is removed from the top 108 of the galley cart 100, step 818, and may be emptied, step 820, and stored in the interior cavity 120 of the galley cart 100, step 822. The position engagement system is released, step 824 and the dispensing tower 138 is retracted into the galley cart 100, step 826. A cover plate 182 may be installed to cover a spigot slot 178 on the galley cart top 108, step 828.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. A galley cart carbonated beverage dispensing system comprising:
    a housing defining a cavity;
    a first mounting ring configured to support a beverage keg in the cavity;
    a second mounting ring configured to support a carbonation cylinder in the cavity, wherein the carbonation cylinder is configured to be connected to the beverage keg; and,
    a spigot supported on a dispensing tower retractably extending from a top of the housing and configured to be connected to the beverage keg, said dispensing tower extending from a support element telescopically engaged in a cylindrical receiver and having a position engagement system comprising stubs extending from the support element and received in vertical slots in the receiver, said support element rotatable to engage the stubs in detents proximate a top of the vertical slots to fix the support element in the receiver at an extended position of the dispensing tower and releasable for vertical translation of the support element into the receiver to position the dispensing tower in a retracted position, said top of the housing having a slot adapted to receive the spigot in the retracted position.

2. The galley cart carbonated beverage dispensing system as defined in claim 1 further comprising a door coupled to the housing, the door configured to be moved between a closed position and an open position.

3. The galley cart carbonated beverage dispensing system as defined in claim 2 further comprising a second door coupled to the housing.

4. A galley cart carbonated beverage dispensing system comprising:
   a housing defining a cavity;
   a keg received in the cavity;
   a carbonation cylinder received in the cavity and connected to the keg; and,
   a spigot supported on a dispensing tower extending from a top of the housing and connected to the keg, said dispensing tower extending from a support element telescopically engaged in a cylindrical receiver and having a position engagement system comprising stubs extending from the support element and received in vertical slots in the receiver, said support element rotatable to engage the stubs in detents proximate a top of the vertical slots to fix the support element in the receiver at an extended position of the dispensing tower and releasable for vertical translation of the support element into the receiver to position the dispensing tower in a retracted position in the cavity, said top of the housing having a slot adapted to receive the spigot in the retracted position.

5. The galley cart carbonated beverage dispensing system as defined in claim 4 further comprising a mounting ring on a bottom of the housing receiving the keg.

6. The galley cart carbonated beverage dispensing system as defined in claim 5 further comprising a second mounting ring on the bottom of the housing receiving the carbonation cylinder.

7. A method for dispensing a carbonated beverage, the method comprising:
   mounting a beverage keg in a galley cart;
   mounting a CO2 cylinder in the galley cart;
   connecting the CO2 cylinder to a tap on the keg;
   connecting a supply tube connection from the to a dispensing connection on a spigot;
   extending a dispensing tower carrying the spigot from a top of the galley cart, wherein the dispensing tower is extended from a support element telescopically engaged in a cylindrical receiver; and
   securing the dispensing tower with a position engagement system in the extended position, wherein the position engagement system comprises stubs extending from the support element and received in vertical slots in the receiver, said support element rotatable to engage the stubs in detents proximate a top of the vertical slots at an extended position of the dispensing tower;
   dispensing the beverage from the spigot;
   upon completion of desired dispensing of the beverage, releasing the position engagement system by oppositely rotating the stubs from the detents releasing the support element for vertical translation into the receiver to position the dispensing tower in a retracted position in the cavity, a top of the galley cart having a slot adapted to receive the spigot in the retracted position.

8. The method as defined in claim 7 further comprising receiving a glass holder and overflow sump on the top of the galley cart under the spigot.

9. The method as defined in claim 8 further comprising removing the glass holder and overflow sump from the top of the galley cart and emptying the overflow sump.

10. The method as defined in claim 9 further comprising storing the glass holder and overflow sump in the interior cavity of the galley cart.

11. The method as defined in claim 9 further comprising installing a cover plate to cover a spigot slot on the galley cart top.

12. The galley cart carbonated beverage dispensing system as defined in claim 1 further comprising a glass holder and overflow sump removably engaged on the top of the housing and covering the slot.

13. The galley cart carbonated beverage dispensing system as defined in claim 12 wherein the glass holder and overflow sump when removed from the top of the housing is received on lateral supports in the cavity.

14. The galley cart carbonated beverage dispensing system as defined in claim 1 wherein the spigot has a dispensing tube connection in the dispensing tower and further comprising a line engaged between a supply tube connection on the keg tap and the dispensing tube connection.

\* \* \* \* \*